(12) United States Patent
Hino et al.

(10) Patent No.: US 6,178,151 B1
(45) Date of Patent: Jan. 23, 2001

(54) OPTICAL HEAD HAVING A REPRODUCING OPTICAL SYSTEM AND FILTER FORMED BY LIGHT PASSING THERETHROUGH

(75) Inventors: Yasumori Hino, Ikoma; Norio Miyatake, Kobe; Masahiro Birukawa, Hirakata; Tadashi Nakamura, Katano, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/057,887

(22) Filed: Apr. 9, 1998

(30) Foreign Application Priority Data

Apr. 10, 1997 (JP) .................................................... 9-091921

(51) Int. Cl.$^7$ ........................................................ G11B 7/00
(52) U.S. Cl. ................................................ 369/118; 369/112
(58) Field of Search .................................... 369/118, 119, 369/112, 110, 44.23, 44.24, 44.12

(56) References Cited

U.S. PATENT DOCUMENTS

| | | | | |
|---|---|---|---|---|
| 4,517,666 | * | 5/1985 | Ando | 369/118 |
| 4,546,460 | * | 10/1985 | Ando | 369/118 |
| 5,004,900 | * | 4/1991 | Seya et al. | 369/44.24 |
| 5,504,724 | * | 4/1996 | Yang | 369/44.24 |
| 5,590,110 | | 12/1996 | Sato | 369/100 |
| 5,610,895 | * | 3/1997 | Izumi et al. | 369/118 |
| 5,657,305 | * | 8/1997 | Sasaki et al. | 369/118 |
| 5,724,334 | * | 3/1998 | Ohba et al. | 369/118 |
| 5,912,868 | * | 6/1999 | Hayashi et al. | 369/44.24 |

FOREIGN PATENT DOCUMENTS 5135401   6/1993   (JP) .

* cited by examiner

*Primary Examiner*—Nabil Hindi
(74) *Attorney, Agent, or Firm*—Renner, Otto, Boisselle & Sklar LLP (57) ABSTRACT

An optical head includes: a light source; a photodetector for generating a prescribed signal based on light which the photodetector receives; a converging optical system for converging a light beam emitted from the light source to be incident upon a prescribed reflective member; and a reproducing optical system for guiding reflected light from the prescribed reflective member to the photodetector. The reproducing optical system is configured for converging light on a prescribed converging point, and a filter having a light transmissive region for allowing light in the vicinity of a center of the converged light to selectively pass therethrough is provided in the vicinity of the converging point. The light transmissive region of the filter is formed by light which has passed through at least a part of the reproducing optical system and has been converged.

30 Claims, 6 Drawing Sheets

OPTICAL HEAD HAVING A REPRODUCING OPTICAL SYSTEM AND FILTER FORMED BY LIGHT PASSING THERETHROUGH

BACKGROUND OF THE INVENTION

1. Field of the Invention

The present invention relates to an optical head which can be used for an optical disk apparatus performing reproduction and/or recording of data through use of a laser beam, and performs reading and/or recording of a signal, and also to a method for producing the same.

2. Description of the Related Art

Recently, optical disk media have been practically used as high-capacity data files. Realization of optical disk media having a higher capacity has been desired in order to widen the range of applications thereof. Regarding a recording density of an optical disk apparatus, the partial response technology has put to practical use a recording density of about 0.3 μm/bit for a linear density direction and a recording density of about 1.2 μm/track for a track direction.

An improvement in the recording density of the optical disk apparatus can be realized by a reduction in the size of a light spot formed on an optical disk medium by a light beam which is converged by an optical head. Such a size of the light spot formed by the optical head is generally determined by a wavelength of a light source and an aperture of a converging lens. Accordingly, various systems in which the size of the light spot is reduced through an improvement in these parameters in order to improve the recording density of the optical disk apparatus have been proposed.

In one of these proposed systems, such as that disclosed in Japanese Laid-Open Publication No. 5-135401 and U.S. Pat. No. 5,590,110, light reflected from the optical disk medium is converged again using a lens, and only the light in a central portion of the converged light beam is separated and detected by being passed through a pinhole region of a pinhole filter. Such a system enables a signal to be reproduced with a resolution higher than an original resolution determined by the wavelength of the light source and the aperture of the converging lens employed in the optical system, thereby making possible the realization of a high-density optical disk apparatus.

In the following, this system is referred to simply as "optical head super-resolution reproducing system."

In the optical head super-resolution reproducing system according to the conventional technology, it is necessary that the pinhole region of the pinhole filter be aligned with the central portion of the converged light beam with high precision on the order of a micron. In this case, the alignment in the focal length direction from the lens can be realized easily to some extent by arranging the pinhole filter at a design-based, prescribed position. However, in order to obtain sufficient functioning of the optical head super-resolution reproducing system, it is necessary that the converged light beam precisely pass through the minute pinhole region of the pinhole filter. This requires that the pinhole filter be precisely two-dimensionally aligned in a plane which is spaced from the lens by a focal length and is perpendicular to an optical axis (this plane may be referred to as "focal length plane" in the following).

In reality, however, it is impossible to achieve a sufficient level of precision in such alignment of the pinhole region (especially, the two-dimensional alignment in the focal length plane). Consequently, it is extremely difficult to put the optical head super-resolution reproducing system into practical use.

SUMMARY OF THE INVENTION

An optical head of the present invention includes: a light source; a photodetector for generating a prescribed signal based on light which the photodetector receives; a converging optical system for converging a light beam emitted from the light source to be incident upon a prescribed reflective member; and a reproducing optical system for guiding reflected light from the prescribed reflective member to the photodetector. The reproducing optical system is configured for converging light on a prescribed converging point, and a filter having a light transmissive region for allowing light in the vicinity of a center of the converged light to selectively pass therethrough is provided in the vicinity of the converging point. The light transmissive region of the filter is formed by light which has passed through at least a part of the reproducing optical system and has been converged.

The prescribed reflective member may be an optical disk medium. Furthermore, the optical disk medium may be a magneto-optical disk medium.

In one embodiment of the invention, the optical head has an optical arrangement of a finite luminous flux system.

Preferably, the light transmissive region of the filter may be formed by the reflected light which has passed through the reproducing optical system and has been converged.

In one embodiment of the invention, the reproducing optical system includes a converging lens for converging the reflected light, and the filter is provided on a surface opposing a lens-forming surface of the converging lens.

In another embodiment of the invention, a film made of a material which has a higher refractive index than the converging lens is formed between the surface opposing the lens-forming surface of the converging lens and the filter.

In one embodiment of the invention, the filter is formed using a film made of a material which has a melting point of about 500° C. or lower. For example, the film may be a Te—C film.

Alternatively, the filter may be formed using a film of a dye whose transmittance reversibly changes in accordance with optical energy of irradiated light. For example, the dye may be a photon mode photochromic dye.

In one embodiment of the invention, the light transmissive region of the filter is provided at a position which is offset from a converging point obtained in the case where an optical axis of the reproducing optical system and the filter are arranged so as to be perpendicular to each other.

The light source, the converging optical system and the reproducing optical system may be integrally structured.

Another aspect of the present invention provides a method for producing an optical head, which includes: a light source; a photodetector for generating a prescribed signal based on light which the photodetector receives; a converging optical system for converging a light beam emitted from the light source to be incident upon a prescribed reflective member; and a reproducing optical system for guiding reflected light from the prescribed reflective member to the photodetector. The method includes the steps of: configuring the reproducing optical system so as to converge light on a prescribed converging point; providing a film made of a prescribed material in the vicinity of the converging point; and irradiating the film made of a prescribed material with light which has passed through at least a part of the reproducing optical system and has been converged to form a filter having a light transmissive region for allowing light in the vicinity of a center of the converged light to selectively pass therethrough.

In one embodiment of the invention, the method further includes the step of increasing an amount of the reflected light which is guided from the prescribed reflective member to the reproducing optical system. For example, the step of increasing an amount of the reflected light may include the step of changing a polarization state of the reflected light.

The prescribed reflective member may be an optical disk medium. Furthermore, the optical disk medium may be a magneto-optical disk medium.

In one embodiment of the invention, an optical arrangement of a finite luminous flux system is provided.

In one embodiment of the invention, the film made of a prescribed material is provided on a surface opposing a lens-forming surface of a converging lens which is included in the reproducing optical system and converges the reflected light.

In another embodiment of the invention, the method further includes the step of forming a film made of a material which has a higher refractive index than the converging lens between the surface opposing the lens-forming surface of the converging lens and the film made of a prescribed material.

In one embodiment of the invention, the film of a prescribed material is a film made of a material which has a melting point of about 500° C. or lower. For example, the film may be a Te—C film.

Alternatively, the film of a prescribed material may be a film of a dye whose transmittance reversibly changes in accordance with optical energy of irradiated light. For example, the dye may be a photon mode photochromic dye.

In one embodiment of the invention, the light transmissive region of the filter is provided at a position which is offset from a converging point obtained in the case where an optical axis of the reproducing optical system and the filter are arranged so as to be perpendicular to each other.

In one embodiment of the invention, the method further includes the step of integrally structuring the light source, the converging optical system and the reproducing optical system.

In one embodiment of the invention, the light transmissive region of the filter is formed by the reflected light which has been reflected by the reflective member, has then passed through the reproducing optical system and has been converged. For example, an optical disk medium may be used as the reflective member, and the light transmissive region of the filter may be formed by the reflected light which has been reflected by the optical disk medium, has then passed through the reproducing optical system and has been converged.

In another embodiment of the invention, the step of forming the filter includes the steps of: placing a reflective plate as the prescribed reflective member; irradiating the film made of a prescribed material with the reflected light which has been reflected by the reflective plate, has then passed through the reproducing optical system and has been converged.

Thus, the invention described herein makes possible the advantages of (1) providing a method for producing an optical head in which a filter (i.e., pinhole filter), allowing only light in a central portion of a converged light beam to pass therethrough, is formed and aligned with ease and high precision, thereby making possible reproducing a high-density optical disk by an optical head super-resolution reproducing system, and (2) providing an optical head formed by such a method.

These and other advantages of the present invention will become apparent to those skilled in the art upon reading and understanding the following detailed description with reference to the accompanying figures.

DESCRIPTION OF THE PREFERRED EMBODIMENTS

The present invention will be described below by way of illustrative examples with reference to the accompanying drawings. Like reference numerals refer to like parts throughout this specification. The description of the like parts will not be repeated.

EXAMPLE 1

Figure 1:
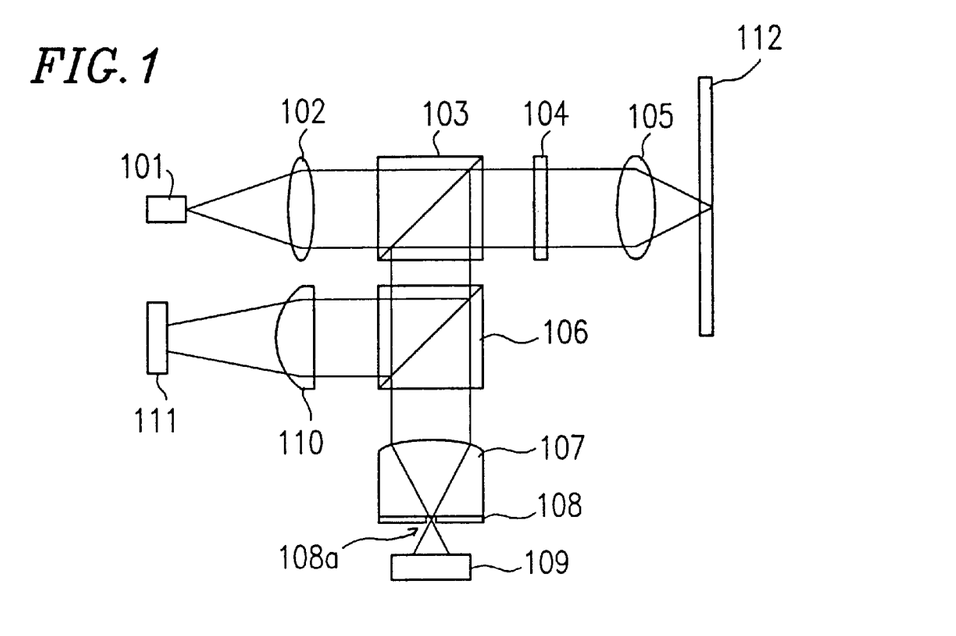
FIG. 1 is a diagram showing a structure of an optical head according to Example 1 of the present invention.

FIG. 1 is a diagram schematically showing a structure of an optical head according to Example 1 of the present invention.

In an optical system shown in FIG. 1, light emitted from a semiconductor laser 101 as a light source is collimated by a collimator lens 102. The collimated light then passes through a polarization beam splitter 103 which separates the emitted light from the reflected light, and a quarter-wave plate 104 which rotates a polarization plane of the light in order to make possible the separation of the emitted light from the reflected light at the polarization beam splitter 103, and is then converged on a surface of an optical disk medium 112 by a converging lens 105. The above configuration may be referred to as "converging optical system" in this specification.

Light reflected by the optical disk medium 112 is collimated by the converging lens 105, passes through the quarter-wave plate 104, is separated from the optical path of the emitted light by the polarization beam splitter 103, and is then directed toward a half prism 106. At the half prism 106, a portion of the reflected light is separated as light to be used for detecting an error signal in focus and tracking control. The separated light is converged on a photodetector 111 by a detecting lens 110, and at the photodetector 111, a focus error signal and a tracking error signal for focus and tracking control are detected. The remaining portion of the light which has passed through the half prism 106 is converged again by a converging lens 107, passes through a pinhole region (i.e., light transmissive region) 108a of a pinhole filter 108 formed integrally with the converging lens 107, and is incident upon a photodetector 109. The photodetector 109 generates a reproduced signal based on this incident light. In this specification, such a configuration in which the reflected light is separated by the polarization beam splitter 103 and then reaches either the photodetector 111 or the photodetector 109, may be referred to as "reproducing optical system."

The pinhole filter 108 in the optical system shown in FIG. 1 is further described below.

The converging lens 107 is designed so that a lens shape is formed on one surface thereof (i.e., incident surface), and the other surface thereof opposing the incident surface (i.e., converging surface) is spaced from the incident surface by a distance corresponding to the focal length of the converging lens 107 (specifically, the lens shape formed on the incident surface). A thin Ti film having a thickness of about 100 nm is formed on the converging surface by sputtering. In the following description, the thin Ti film included in the pinhole filter is denoted by the same reference numeral as the pinhole filter, that is, 108 for the sake of simplification of the description.

Next, the pinhole region 108a exhibiting a function as an optical filter is formed in the thin Ti film 108 at a position corresponding to the focal position of the converging lens 107, employing, for example, the following method.

Figure 2A:
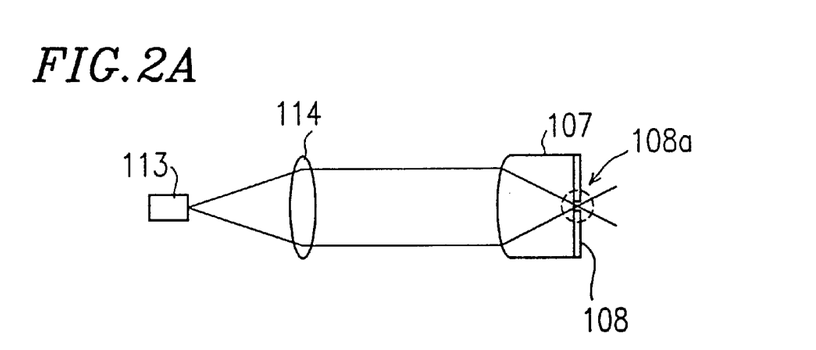
FIG. 2A is a diagram showing a method for making a pinhole filter which can be included in the structure of the optical head shown in FIG. 1.

FIG. 2A is a diagram schematically showing an arrangement of an optical system for forming the pinhole region 108a. Specifically, light emitted from a semiconductor laser 113 as a light source is collimated by a collimator lens 114. The collimated light is incident upon the incident surface of the converging lens 107 which is adjusted to be positioned so as to be perpendicular to the optical axis of the emitted light from the semiconductor laser 113, and forms a focal point on the converging surface of the converging lens 107 on which the thin Ti film 108 is formed. This increases the temperature of and melts the thin Ti film 108 at a position corresponding to the focal position (i.e., converging portion) of the converging lens 107, thereby forming the pinhole region 108a. As a result, the pinhole filter 108 which allows only light in a central portion of a light beam to pass through the pinhole region 108a is formed on the converging surface of the converging lens 107 by using light which has actually passed through the reproducing optical system (or at least the converging lens 107 as a part thereof).

The pinhole filter 108 which is thus formed integrally with the converging lens 107 is placed in a prescribed position in the optical system shown in FIG. 1.

In the above-described method of the Example 1, a satisfactory pinhole region 108a is formed by setting the laser power of the semiconductor laser 113 at 95 mW and irradiating pulsed light for 500 ns.

Figure 2B:
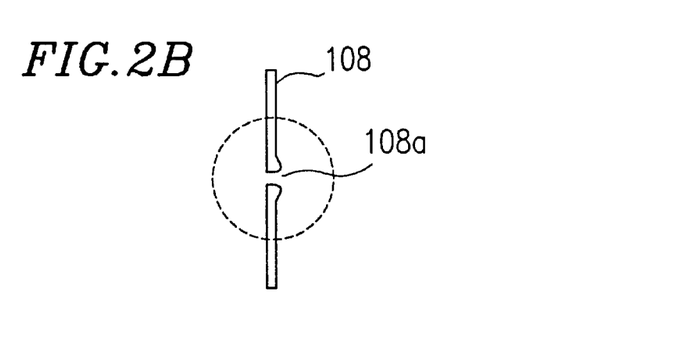
FIG. 2B is an enlarged cross-sectional view of a vicinity of a pinhole region of the pinhole filter provided according to the method shown in FIG. 2A.

FIG. 2B is an enlarged diagram schematically showing a cross-section of a vicinity of the pinhole region (i.e., light transmissive region) 108a of the pinhole filter 108 thus made. Since the pinhole region 108a according to Example 1 is formed by thermally melting the thin Ti film, the peripheral portion of the pinhole region 108a has a slightly rising shape.

Figure 3:
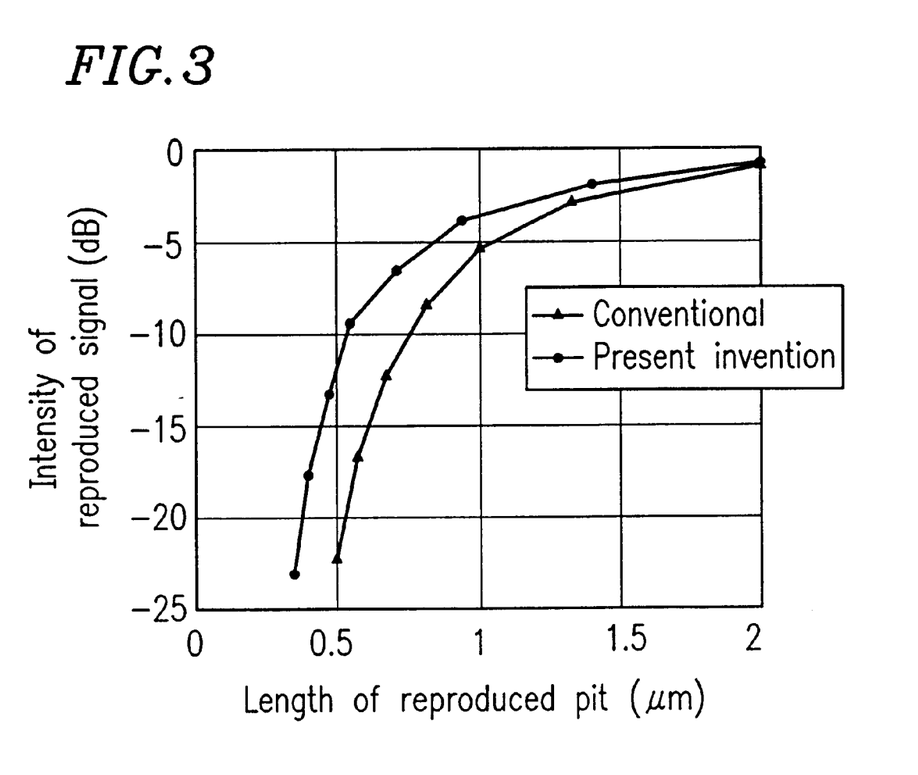
FIG. 3 is a graph showing results of a comparison between reproduction characteristics of the optical head shown in FIG. 1 and those of a conventional optical head.

Reproduction characteristics of the optical head of Example 1 is shown in FIG. 3. Specifically, FIG. 3 shows a comparison between the optical head having the pinhole filter according to the present invention and an optical head having no pinhole filter according to conventional technology in terms of the intensity of reproduced signals (shown on the vertical axis) obtained by reproducing pits having a length shown on the horizontal axis.

The optical head of Example 1 having the pinhole filter is shown to have an improved reproduction resolution and to be able to reproduce a shorter recorded mark (i.e., pit), compared to the conventional optical head having no pinhole filter. Specifically, with the optical head of Example 1, the same intensity of a reproduced signal can be obtained from a pit having a length of approximately two thirds of that of a pit required by the conventional optical head. Therefore, according to the optical head of Example 1, recording and reproduction of an optical disk medium having about 1.5 times as high a density as that of the conventional optical disk medium is realized without the need for an alignment of the pinhole filter 108 (i.e., alignment in the focal length direction from the converging lens 107).

EXAMPLE 2

Figure 4:
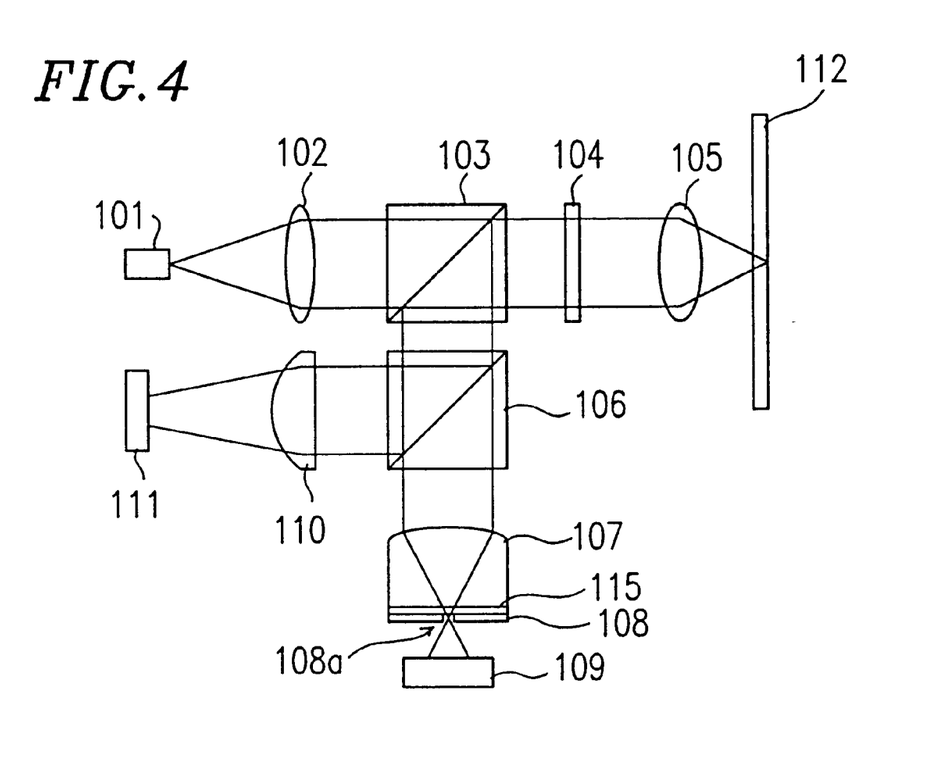
FIG. 4 is a diagram showing a structure of an optical head according to Example 2 of the present invention.

FIG. 4 is a diagram schematically showing a structure of an optical head according to Example 2 of the present invention.

In the configuration shown in FIG. 4, the thin Ti film 108 is not formed directly on the converging surface when forming the pinhole filter 108 integrally with the converging lens 107. Instead, a ZnS film 115 is firstly formed on the converging surface, and thereon the thin Ti film 108 is formed. Both the ZnS film 115 and the thin Ti film 108 are formed by sputtering.

The ZnS film 115 has a refractive index of 2.3. This value is large compared to that of the converging lens 107, which is 1.5. Accordingly, multiple reflection arises between the converging lens 107 and the thin Ti film 108, thereby increasing the amount of light absorbed by the thin Ti film 108. Further, the ZnS film 115 has a smaller thermal conductivity than the converging lens 107, which restrains diffusion of heat generated by irradiated light. As a result, in Example 2, the pinhole region (i.e., light transmissive region) 108a is formed in the thin Ti film 108 with a smaller laser power (i.e., optical energy) than in Example 1.

Specifically, the method for forming the pinhole region 108a in the pinhole filter 108 described in Example 1 is used for the structure of Example 2, and a satisfactory pinhole region 108a is formed by setting the laser power of the semiconductor laser 113 at 32 mW (as compared with 95 mW in Example 1) and irradiating pulsed light for 500 ns.

EXAMPLE 3

Figure 5:
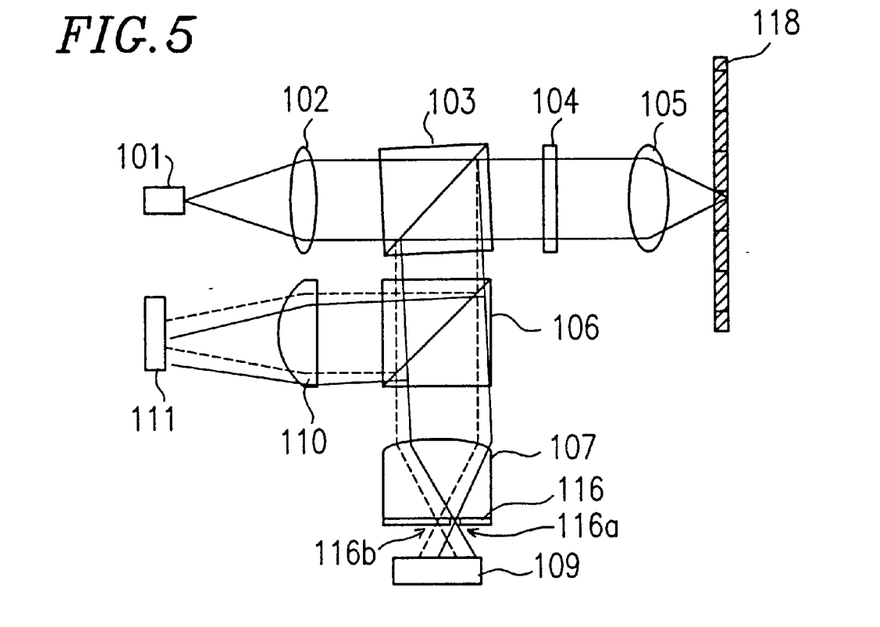
FIG. 5 is a diagram showing a structure of an optical head according to Example 3 of the present invention.

FIG. 5 is a diagram schematically showing a structure of an optical head according to Example 3 of the present invention.

In Example 1 described above, the pinhole filter 108 is formed integrally with the converging lens 107 beforehand using light obtained by converging collimated light with the converging lens in the reproduction optical system, and then is placed in a prescribed position of the reproducing optical system. This eliminates the need for an alignment of the pinhole filter 108 in the focal length direction from the converging lens 107. However, it is still required to arrange the pinhole filter 108 formed integrally with the converging lens 107 so as to be perpendicular to the optical axis of the reproducing optical system.

In FIG. 5, full lines indicate an optical path in the case where the optical axis of the reproducing optical system (i.e., reproducing optical axis) is caused to be inclined by, for example, misalignment of the polarization beam splitter 103 during attachment, while dotted lines indicate an ideal optical path with no such inclination of the reproducing optical axis. The focal position of the converging lens 107, in the case in which the reproducing optical axis is inclined, is not aligned with a central position 116b of the converging surface of the converging lens 107 (i.e., focal position of the converging lens 107 for collimated light). In the method for forming a pinhole region described in Example 1, the pinhole region is formed beforehand using collimated light, and accordingly, the pinhole region is formed at a central region of the converging surface of the converging lens (i.e., the position denoted by the reference numeral 116b in the structure shown in FIG. 5). Therefore, correct functioning of the optical head requires that the pinhole filter formed integrally with the converging lens be arranged precisely perpendicular to the optical axis of the reproducing optical system.

In Example 3, in contrast, a pinhole region (i.e., light transmissive region) 116a of a pinhole filter 116 is formed in the following manner.

A thin Te—C film 116 having a thickness of about 100 nm is formed on the converging surface of the converging lens 107 by performing sputtering under a mixed atmosphere of $CH_4$ gas and Ar gas. Since the thin Te—C film 116 has a melting point of as low as about 450° C., formation of the pinhole region 116a with a low laser power is possible. However, at a stage where the converging lens 107 with the thin Te—C film 116 formed thereon is arranged in the optical system shown in FIG. 5, the pinhole region 116a is not yet formed, and accordingly, the thin Te—C film 116 does not exhibit a function as a pinhole filter. The pinhole region 116a is formed in the following manner after completing the arrangement of each component included in the optical system.

As shown in FIG. 5, a reflecting plate 118 is provided in a position where an optical disk medium is supposed to be provided. Using a focus error signal from the photodetector 111, the focal point of the converging lens 105 is adjusted to be on the reflecting plate 118. In this state, the amount of light emitted from the light source (i.e., semiconductor laser) 101 is increased, and light reflected by the reflecting plate 118 is converged on the thin Te—C film 116 formed on the converging surface of the converging lens 107. This increases the temperature of and melts the thin Te—C film 116 at a position corresponding to the focal position of the converging lens 107 for light which has actually passed through the reproducing optical system, thereby forming the pinhole region 116a. As a result, the pinhole region 116a is formed at the focal position of the converging lens 107 in the actual reproducing optical system, not at the focal position 116b of the converging lens 107 for ideal collimated light (i.e., central position of the converging surface of the converging lens 107). In other words, the pinhole region 116a of the pinhole filter 116 in Example 3 is provided at a position which is offset from a converging point obtained in the case where the optical axis of the reproducing optical system and the pinhole filter 116 are arranged so as to be perpendicular to each other.

Alternatively, the pinhole region 116a of the pinhole filter 116 may be formed by providing, instead of the reflecting plate 118, an optical disk medium which can be an object for the actual recording and/or reproduction operation(s), at a prescribed position, and by using the reflected light therefrom. The rest of the process remains the same.

With the structure of Example 3, a satisfactory pinhole region 116a is formed by setting the laser power of the semiconductor laser 101 at 6 mW and irradiating pulsed light for 500 ns. In the optical head thus produced, recording and reproduction of an optical disk medium having about 1.5 times as high a density as that of the conventional optical disk medium is realized with no need for an alignment of the pinhole filter 116 in the focal length direction from the converging lens 107, nor for a two-dimensional alignment of the pinhole filter 116 in a focal length plane.

EXAMPLE 4

Figure 6:
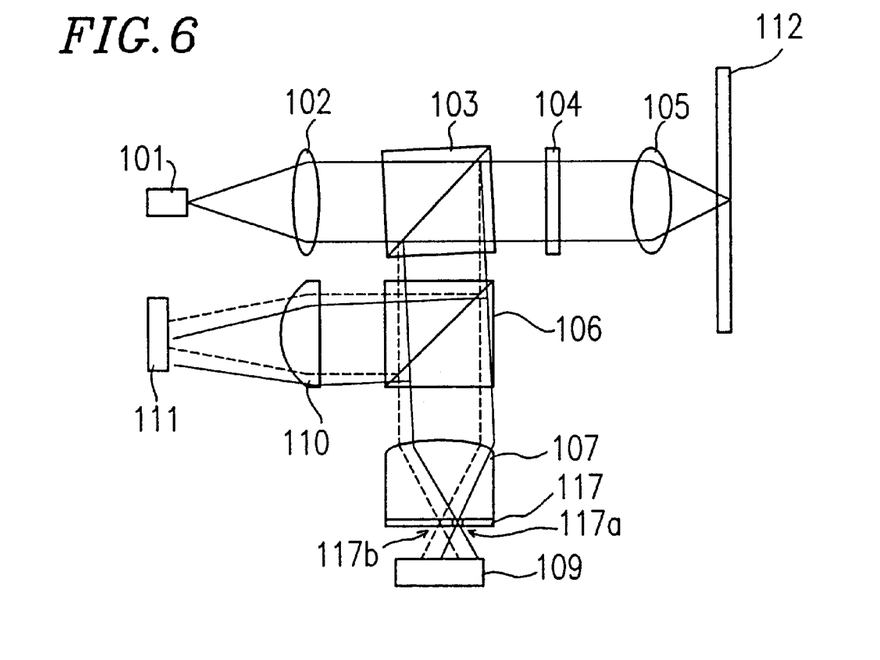
FIG. 6 is a diagram showing a structure of an optical head according to Example 4 of the present invention.

FIG. 6 is a diagram schematically showing a structure of an optical head according to Example 4 of the present invention.

In FIG. 6 as well, full lines indicate an optical path in the case where the optical axis of the reproducing optical system (i.e., reproducing optical axis) is caused to be inclined by, for example, misalignment of the polarization beam splitter 103 during attachment, while dotted lines indicate an ideal optical path with no such inclination of the reproducing optical axis. In Example 4, a problem caused by such an inclination of the reproducing optical axis is overcome by forming a pinhole filter 117 through a use of a dye which becomes transparent with an increase in the temperature and becomes opaque again with a decrease in the temperature (i.e., dye whose transmittance reversibly changes in accordance with a change in the temperature).

Specifically, as shown in FIG. 6, using a focus error signal from the photodetector 111, the focal point of the converging lens 105 for light emitted from the light source 101 of the optical head is adjusted to be on the optical disk medium 112. In this state, the amount of light emitted from the light source (i.e., semiconductor laser) 101 is increased, and light reflected by the optical disk medium 112 is converged on the dye film 117 formed on the converging surface of the converging lens 107. This increases the temperature of and turns transparent the dye film 117 at a position corresponding to the focal position of the converging lens 107 for light which has actually passed through the reproducing optical system. When the temperature of the dye film 117 decreases due to the absence of the reflected light from the optical disk medium 112 upon completion of the reproducing operation, the dye film 117 regains the opacity thereof. As a result, a pinhole region (i.e., light transmissive region) 117a as a transparent region 117a which reversibly changes the state thereof in accordance with a change in the temperature accompanied by irradiation of light is formed, instead of a pinhole region as a physical opening whose state is irreversible such as those obtainable in Examples 1 through 3.

The above method as well forms the pinhole filter 117 having the light transmissive region 117a at the focal position of the converging lens 107 in the actual reproducing optical system, not at the focal position 117b of the converging lens 107 for ideal collimated light (i.e., central position of the converging surface of the converging lens 107). In other words, the pinhole region 117a of the pinhole filter 117 in Example 4 is provided at a position which is offset from a converging point obtained in the case where the optical axis of the reproducing optical system and the pinhole filter 117 are arranged so as to be perpendicular to each other.

Furthermore, such a change in the light transmittance in the dye film 117 as described in the above (i.e., formation of the transparent region 117a) can occur reversibly in accordance with a change in the temperature. Accordingly, when actually reproducing data from the optical disk medium 112, the transparent region 117a is formed on the basis of the optical path of the actual reproducing light. As a result, even if the optical path of the reproducing optical system (in other words, the reproducing optical axis) is offset for some reason, the transparent region 117a is formed in a corresponding manner at a different position. Therefore, even if misalignment is introduced in the optical path of the reproducing optical system (i.e., the reproducing optical axis) due to aging after the assembly of the optical head is completed, the transparent region 117a of the pinhole filter 117 is automatically formed in an optimal position, e.g., during the actual reproduction operation.

In the optical head thus produced, recording and reproduction of an optical disk medium having about 1.3 times as high a density as that of the conventional optical disk medium is realized with no need for an alignment of the pinhole filter 117 in the focal length direction from the converging lens 107, nor for a two-dimensional alignment of the pinhole filter 117 in a focal length plane.

As the dye film 117 in the configuration of Example 4, a film of a photon mode photochromic dye, such as a film of fluorine ring type diarylethene, can be used.

EXAMPLE 5

Figure 7:
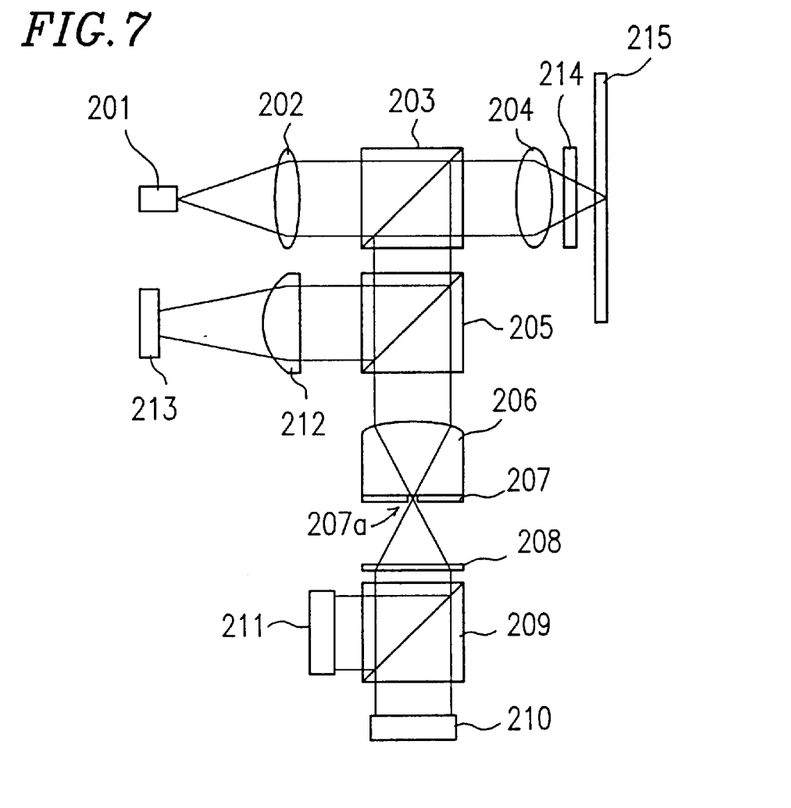
FIG. 7 is a diagram showing a structure of an optical head according to Example 5 of the present invention.

FIG. 7 is a diagram schematically showing a structure of an optical head according to Example 5 of the present invention. Specifically, Example 5 relates to a structure of an optical head where a magneto-optical disk medium is used as an optical disk medium.

In an optical system shown in FIG. 7, light emitted from a semiconductor laser 201 as a light source is collimated by a collimator lens 202. The collimated light then passes through a polarization beam splitter 203 which separates the emitted light from the reflected light, and is converged on a magneto-optical disk medium 215 by a converging lens 204. The above configuration corresponds to a converging optical system. A quarter-wave plate 214 shown between the converging lens 204 and the magneto-optical disk medium 215 is inserted only when a pinhole region (i.e., light transmissive region) 207a is formed in a pinhole filter 207.

Light reflected by the magneto-optical disk medium 215 passes through the quarter-wave plate 214 again, is collimated by the converging lens 204, is separated from the optical path of the emitted light by the polarization beam splitter 203, and is then directed toward a half prism 205. At the half prism 205, a portion of the reflected light is separated as light to be used for detecting an error signal in focus and tracking control. The separated light is converged on a photodetector 213 by a detecting lens 212, and at the photodetector 213, a focus error signal and a tracking error signal for focus and tracking control are detected.

The remaining portion of the light which has passed through the half prism 205 is converged by a converging lens 206, passes through a pinhole region 207a of a pinhole filter 207 formed integrally with the converging lens 206, and is directed toward a half-wave plate 208. The half-wave plate 208 is inserted for the purpose of rotating a polarization plane by 45 degrees in order to perform a differential detection of a reproduced signal. Light which has passed through the half-wave plate 208 is separated into two portions by a beam splitter 209. The two portions of the light are incident upon a photodetector 210 and a photodetector 211 respectively, where a differential detection of a reproduced signal is performed.

The above configuration where the reflected light is separated by the polarization beam splitter 203 and then reaches either the photodetector 213, the photodetector 211, or the photodetector 210 corresponds to a reproducing optical system.

The pinhole filter 207 in the optical system shown in FIG. 7, is formed using a thin Te—C film and light actually reflected by a prescribed reflecting plate placed at a position of the magneto-optical disk medium 215 as in Example 3. Alternatively, the pinhole region 207a of the pinhole filter 207 may be formed by providing, instead of the reflecting plate, the magneto-optical disk medium 215 which can be an object for the actual recording and/or reproduction operation (s), at a prescribed position, and by using the reflected light therefrom. The rest of the process remains the same.

The polarization beam splitter 203 included in the optical head for the magneto-optical disk medium 215 in Example 5 reflects an S-polarization component contained in the reflected light from the magneto-optical disk medium 215 in such a manner as to guide the S-polarization component to the reproducing optical system (i.e., as to direct the S-polarization component toward the half prism 205). In reality, however, reflected light from the magneto-optical disk medium 215 is in most part made up of a P-polarization component. The polarization beam splitter 203 reflects only 20–30% of such P-polarization component. Therefore, with a common structure of an optical system for reproducing the magneto-optical disk medium 215, sufficient power of converged light for forming the pinhole region 207a in the thin Te—C film 207 is not obtained.

To overcome this problem, the quarter-wave plate 214 is inserted between the converging lens 204 and the reflecting plate corresponding to the magneto-optical disk medium 215 as shown in FIG. 7 when forming the pinhole region 207a. This changes the reflected light from the reflecting plate into S-polarization light. As a result, the reflected light whose polarization state has been changed is effectively guided to the reproducing optical system by the polarization beam splitter 203 with sufficient power, and the pinhole region 207a having a prescribed shape is formed in the thin Te—C film 207.

In the optical head thus produced as well, recording and reproduction of an optical disk medium having about 1.5 times as high a density as that of the conventional optical disk medium is realized with no need for an alignment of the pinhole filter 207 in the focal length direction from the converging lens 206, nor for a two-dimensional alignment of the pinhole filter 207 in a focal length plane.

EXAMPLE 6

Figure 8:
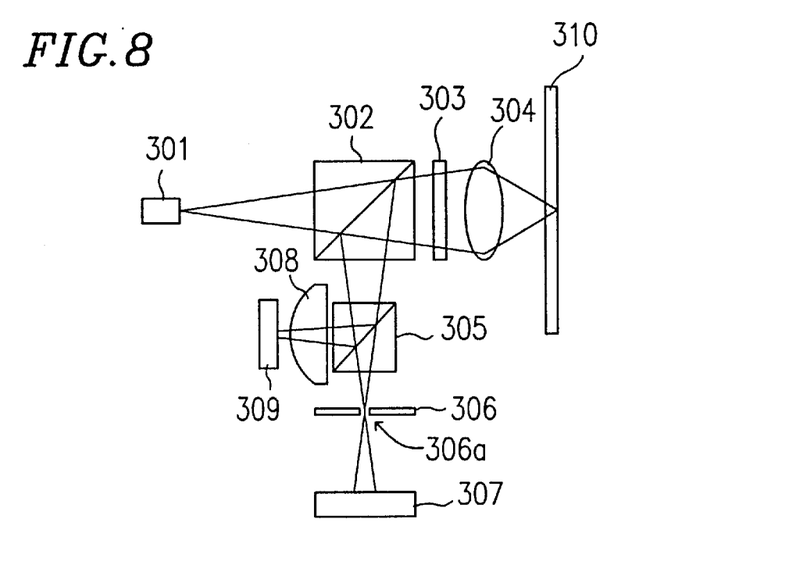
FIG. 8 is a diagram showing a structure of an optical head according to Example 6 of the present invention.

FIG. 8 is a diagram schematically showing a structure of an optical head according to Example 6 of the present invention. Specifically, Example 6 relates to the structure of an optical head of a finite luminous flux system.

In an optical system shown in FIG. 8, light emitted from a semiconductor laser 301 as a light source passes through a polarization beam splitter 302 which separates the emitted light from the reflected light and a quarter-wave plate 303 which rotates a polarization plane of light in order to make possible the separation of the emitted light from the reflected light at the polarization beam splitter 302, and then is converged on an optical disk medium 310 by a converging lens 304. The above configuration corresponds to a converging optical system.

Light reflected by the optical disk medium 310 passes through the converging lens 304 and the quarter-wave plate 303 again, is separated from the optical path of the emitted light by the polarization beam splitter 302, and is then directed toward a half prism 305. At the half prism 305, a portion of the reflected light is separated as light to be used for detecting an error signal in focus and tracking control. The separated light is converged on a photodetector 309 by a detecting lens 308, and at the photodetector 309, a focus error signal and a tracking error signal for focus and tracking control are detected. The remaining portion of light which has passed through the half prism 305 passes through a pinhole region (i.e., light transmissive region) 306a of a pinhole filter 306, and is incident upon a photodetector 307. The photodetector 307 generates a reproduced signal based on this incident light. Such a configuration where the reflected light is separated by the polarization beam splitter 302 and then reaches either the photodetector 309 or the photodetector 307 corresponds to a reproducing optical system.

As mentioned above, the structure shown in FIG. 8 is a finite luminous flux system, in which reflected light from the optical disk medium 310 is converged at a position corresponding to the semiconductor laser 301 in the optical path of the reproducing optical system. Therefore, unlike the structures in Examples 1 through 5, a converging lens for intentionally converging reflected light again is not necessary, while substantially the same effect as that of the structures in Examples 1 through 5 is obtained by providing the pinhole filter 306 at the above-described converging point in the reproducing optical system. Specifically, recording and reproduction of an optical disk medium having about 1.4 times as high a density as that of the conventional optical disk medium is realized without a need for an alignment of the pinhole filter 306.

The pinhole filter 306 is formed by forming, for example, a thin Te—C film on a surface of a plastic plate by sputtering, and then providing the pinhole region 306a at a prescribed position of the thin Te—C film. Preferably, the pinhole region 306a is formed, as in Example 3, by providing a prescribed reflecting plate instead of the optical disk medium 310, and by using light which has been reflected by the reflecting plate and has actually passed through the reproducing optical system. In this way, the pinhole region 306a is formed at a position of the converging point in the actual reproducing optical system, not at a converging point in an ideal optical system arrangement. Accordingly, the need for an alignment of the pinhole filter 306 with high precision (especially, a two-dimensional alignment thereof in a focal length plane) is eliminated. Alternatively, the pinhole region 306a of the pinhole filter 306 may be formed by providing, instead of the reflecting plate, the optical disk medium 310 which can be an object for the actual recording and/or reproduction operation(s), at a prescribed position, and by using the reflected light therefrom. The rest of the process is remains the same.

EXAMPLE 7

Figure 9:
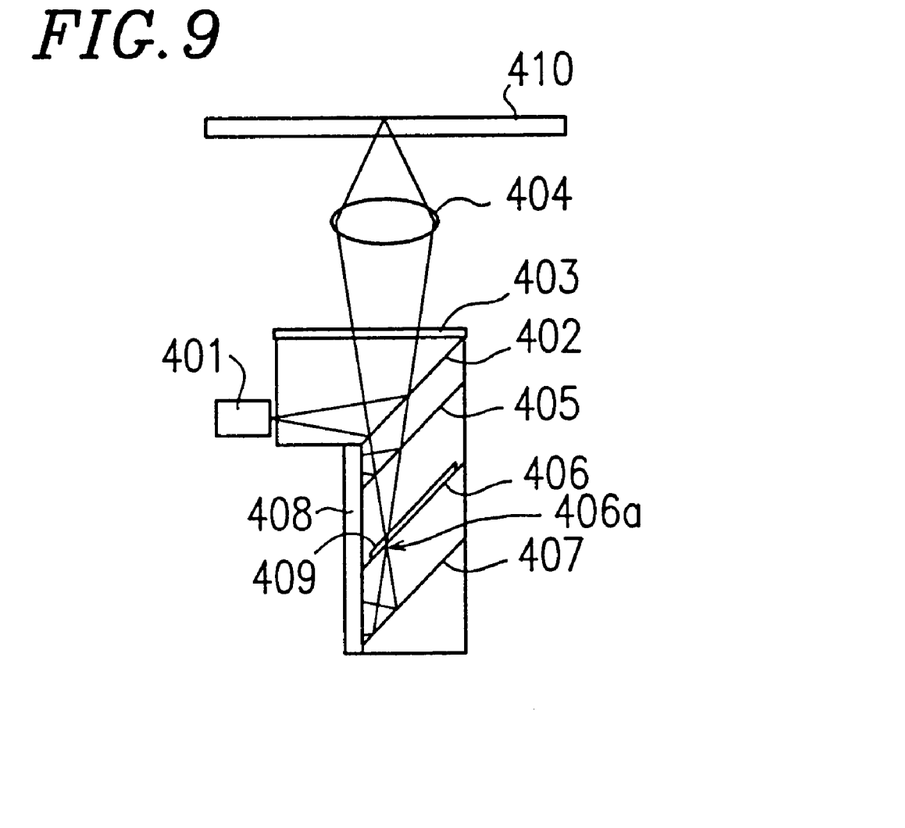
FIG. 9 is a diagram showing a structure of an optical head according to Example 7 of the present invention.

FIG. 9 is a diagram schematically showing a structure of an optical head according to Example 7 of the present invention. Specifically, Example 7 relates to a structure in which a light source, a photodetector and other optical elements included in an optical head for a finite luminous flux system, are integrated.

In an optical system shown in FIG. 9, light emitted from a semiconductor laser 401 as a light source has the optical path thereof changed by a polarization beam splitter surface 402 which separates the emitted light from the reflected light, passes through a quarter-wave plate 403 which rotates a polarization plane of light in order to make possible the separation of the emitted light from the reflected light at the polarization beam splitter surface 402, and is then converged on an optical disk medium 410 by a converging lens 404. The above configuration corresponds to a converging optical system.

Light reflected by the optical disk medium 410 passes through the converging lens 404 and the quarter-wave plate 403 again, is separated from the optical path of the emitted light by the polarization beam splitter surface 402, and is then directed toward a half prism surface 405. On the half prism surface 405, a hologram pattern for separating a portion of the reflected light as light to be used for detecting an error signal in focus and tracking control, and converging the separated light on a photodetector 408, is formed. Based on the incident light thus obtained, the photodetector 408 detects a focus error signal and a tracking error signal for focus and tracking control. The remaining portion of light which has passed through the half prism surface 405 passes through a pinhole region (i.e., light transmissive region) 406a of a pinhole filter 406, which is, for example, formed of a thin Te—C film formed by sputtering. Then, this light is reflected by a mirror surface 407 and is incident upon the photodetector 408 mentioned above, where a reproduced signal is detected. Such a structure where the reflected light is separated by the polarization beam splitter surface 402 and then reaches the photodetector 408 corresponds to a reproducing optical system.

As mentioned above, the structure shown in FIG. 9 is a finite luminous flux system, in which the reflected light from the optical disk medium 410 is converged at a position corresponding to the semiconductor laser 401 in the optical path of the reproducing optical system. Therefore, a converging lens for intentionally converging the reflected light again is not necessary, while substantially the same effect as that of the structures in Examples 1 through 6 is obtained only by providing the pinhole filter 406 at the above-described converging point in the reproducing optical system.

Preferably, the pinhole region 406a is formed in the pinhole filter 406, as in Example 3, by providing a prescribed reflecting plate instead of the optical disk medium 410, and by using light which has been reflected by the reflecting plate and has actually passed through the reproducing optical system. In this way, the pinhole region 406a is formed at a position of the converging point in the actual reproducing optical system, not at a converging point in an ideal optical system arrangement. Alternatively, the pinhole region 406a of the pinhole filter 406 may be formed by providing, instead of the reflecting plate, the optical disk medium 410 which can be an object for the actual recording and/or reproduction operation(s), at a prescribed position, and by using the reflected light therefrom. The rest of the process remains the same.

In the optical head having the structure shown in FIG. 9, prescribed space 409 is provided in the vicinity of a junction surface on which the pinhole filter 406 is provided (i.e., the surface on which the thin film included in the pinhole filter 406 is formed by sputtering). The space 409 prevents diffusion of heat at the time of forming the pinhole region 406a, thereby making possible formation of the pinhole region 406a with a low laser power.

In the optical head of Example 7, optical elements such as the light source (i.e., semiconductor laser) 401, the photodetector 408, polarization beam splitter surface 402, the quarter-wave plate 403, the half prism surface 405, the pinhole filter 406, and the mirror surface 407, are integrated into one component. Conventionally, it is almost impossible to incorporate a pinhole filter into such an integrated optical head since it is extremely difficult to achieve a high-precision alignment of the pinhole filter. According to the present invention, however, it is possible to form the pinhole region 406a of the pinhole filter 406 at a position of the converging point in the actual reproducing optical system after the assembly of the optical head is completed, and therefore, an integrated optical head can be achieved easily.

The integration of the semiconductor laser 401 as a light source with other optical elements in this way prevents a misalignment of the light emitting point (i.e., light source) 401, thereby realizing an optical head having a high degree of stability.

In the above Examples, a pinhole filter includes a metal material film such as a Ti film or a film of a material having a low melting point (specifically, about 500° C. or lower) such as a Te—C film, or a dye film whose transmittance changes reversibly (e.g., a film of a photon mode photochromic dye, such as fluorine ring type diarylethene). However, substantially the same effect that is obtained in the above Examples can be achieved by using other materials as long as such materials make possible forming a pinhole shape by an optical or thermal change (reversible or irreversible change) caused by converged light which has passed at least a part of the reproducing optical system.

According to the present invention, a filter (i.e., pinhole filter) provided in an optical head for realizing a high-density reproduction of an optical disk in the optical head super-resolution reproducing system, can be integrated with a converging lens. Specifically, the converging lens is designed so that a surface thereof on which a lens shape is formed (i.e., incident surface) is spaced from the opposing surface (i.e., converging surface) by a focal length of the converging lens, and the pinhole filter (more precisely, the pinhole region which is the light transmissive region of the pinhole filter) is formed on the converging surface by using light which has been actually converged by the converging lens. This can make unnecessary a precise alignment of the pinhole filter formed beforehand with the focal position of the converging lens, which is required by the conventional technology.

Further, a pinhole region may be formed, not by using a pinhole filter formed beforehand by another apparatus, but by incorporating a pinhole filter forming member into an optical system of the optical head and using light beam which has actually been reflected by an optical disk medium or a prescribed reflecting plate substituting the optical disk medium, and has passed through a reproducing optical system. This makes it possible to precisely form the pinhole region which allows light in the vicinity of the center of the converged light beam to pass therethrough, at the actual focal position of the converged light beam. Accordingly, a two-dimensional alignment of the pinhole filter in a focal length plane of the converged light beam can also be made unnecessary.

Furthermore, when, as the pinhole filter forming material, a material whose transmittance reversibly increases due to an optical or thermal action caused by optical energy, is employed, a reversible increase in the transmittance can be caused at the time of reproducing a signal from the optical disk medium, in the vicinity of the converging point of a light beam which has been reflected by the optical disk medium and has passed through the reproducing optical system. As a result, it is possible to obtain a pinhole filter in which a light transmissive region is automatically formed in an optimal position even if misalignment is caused in the optical axis of the reproducing optical system after the assembly of the optical head is completed.

With the features described above, the present invention makes possible the realization of a super-resolution optical head in a stable and simple manner, without a high-precision alignment of a pinhole filter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head, comprising:
a light source;
a photodetector for generating a prescribed signal based on light which the photodetector receives;
a converging optical system for converging a light beam emitted from the light source to be incident upon a prescribed reflective member; and
a reproducing optical system for guiding reflected light from the prescribed reflective member to the photodetector,
wherein the reproducing optical system is configured for converging light on a prescribed converging point,
a filter having a light transmissive region for allowing light in the vicinity of a center of the converged light to selectively pass therethrough is provided in the vicinity of the converging point, and
the light transmissive region of the filter is formed by light which has passed through at least a part of the reproducing optical system and has been converged.

2. An optical head according to claim 1, wherein the prescribed reflective member is an optical disk medium.

3. An optical head according to claim 2, wherein the optical disk medium is a magneto-optical disk medium.

4. An optical head according to claim 1, wherein the optical head has an optical arrangement of a finite luminous flux system.

5. An optical head according to claim 1, wherein the light transmissive region of the filter is formed by the reflected light which has passed through the reproducing optical system and has been converged.

6. An optical head according to claim 1, wherein the reproducing optical system includes a converging lens for converging the reflected light, and the filter is provided on a surface opposing a lens-forming surface of the converging lens.

7. An optical head according to claim 6, wherein a film made of a material which has a higher refractive index than the converging lens is formed between the surface opposing the lens-forming surface of the converging lens and the filter.

8. An optical head according to claim 1, wherein the filter is formed using a film made of a material which has a melting point of about 500° C. or lower.

9. An optical head according to claim 8, wherein the film is a Te—C film.

10. An optical head according to claim 1, wherein the filter is formed using a film of a dye whose transmittance reversibly changes in accordance with optical energy of irradiated light.

11. An optical head according to claim 10, wherein the dye is a photon mode photochromic dye.

12. An optical head according to claim 1, wherein the light transmissive region of the filter is provided at a position which is offset from a converging point obtained in the case where an optical axis of the reproducing optical system and the filter are arranged so as to be perpendicular to each other.

13. An optical head according to claim 1, wherein the light source, the converging optical system and the reproducing optical system are integrally structured.

14. A method for producing an optical head, the optical head including: a light source; a photodetector for generating a prescribed signal based on light which the photodetector receives; a converging optical system for converging a light beam emitted from the light source to be incident upon a prescribed reflective member; and a reproducing optical system for guiding reflected light from the prescribed reflective member to the photodetector, the method comprising the steps of:

configuring the reproducing optical system so as to converge light on a prescribed converging point;

providing a film made of a prescribed material in the vicinity of the converging point; and irradiating the film made of a prescribed material with light which has passed through at least a part of the reproducing optical system and has been converged to form a filter having a light transmissive region for allowing light in the vicinity of a center of the converged light to selectively pass therethrough.

15. A method for producing an optical head according to claim 14, further comprising the step of increasing an amount of the reflected light which is guided from the prescribed reflective member to the reproducing optical system.

16. A method for producing an optical head according to claim 15, wherein the step of increasing an amount of the reflected light includes the step of changing a polarization state of the reflected light.

17. A method for producing an optical head according to claim 14, wherein the prescribed reflective member is an optical disk medium.

18. A method for producing an optical head according to claim 17, wherein the optical disk medium is a magneto-optical disk medium.

19. A method for producing an optical head according to claim 14, wherein an optical arrangement of a finite luminous flux system is provided.

20. A method for producing an optical head according to claim 14, wherein the film made of a prescribed material is provided on a surface opposing a lens-forming surface of a converging lens which is included in the reproducing optical system and converges the reflected light.

21. A method for producing an optical head according to claim 20, further comprising the step of forming a film made of a material which has a higher refractive index than the converging lens between the surface opposing the lens-forming surface of the converging lens and the film made of a prescribed material.

22. A method for producing an optical head according to claim 14, wherein the film of a prescribed material is a film made of a material which has a melting point of about 500° C. or lower.

23. A method for producing an optical head according to claim 22, wherein the film is a Te—C film.

24. A method for producing an optical head according to claim 14, wherein the film of a prescribed material is a film of a dye whose transmittance reversibly changes in accordance with optical energy of irradiated light.

25. A method for producing an optical head according to claim 24, wherein the dye is a photon mode photochromic dye.

26. A method for producing an optical head according to claim 14, wherein the light transmissive region of the filter is provided at a position which is offset from a converging point obtained in the case where an optical axis of the reproducing optical system and the filter are arranged so as to be perpendicular to each other.

27. A method for producing an optical head according to claim 14, further comprising the step of integrally structuring the light source, the converging optical system and the reproducing optical system.

28. A method for producing an optical head according to claim 14, wherein the light transmissive region of the filter is formed by the reflected light which has been reflected by the reflective member, has then passed through the reproducing optical system and has been converged.

29. A method for producing an optical head according to claim 28, wherein an optical disk medium is used as the reflective member, and the light transmissive region of the filter is formed by the reflected light which has been reflected by the optical disk medium, has then passed through the reproducing optical system and has been converged.

30. A method for producing an optical head according to claim 14, wherein the step of forming the filter comprises the steps of:

placing a reflective plate as the prescribed reflective member;

irradiating the film made of a prescribed material with the reflected light which has been reflected by the reflective plate, has then passed through the reproducing optical system and has been converged.

* * * * *